No. 12,425.
REISSUED DEC. 19, 1905.
R. W. KING.
BUILDING CONSTRUCTION.
APPLICATION FILED JAN. 23, 1903.
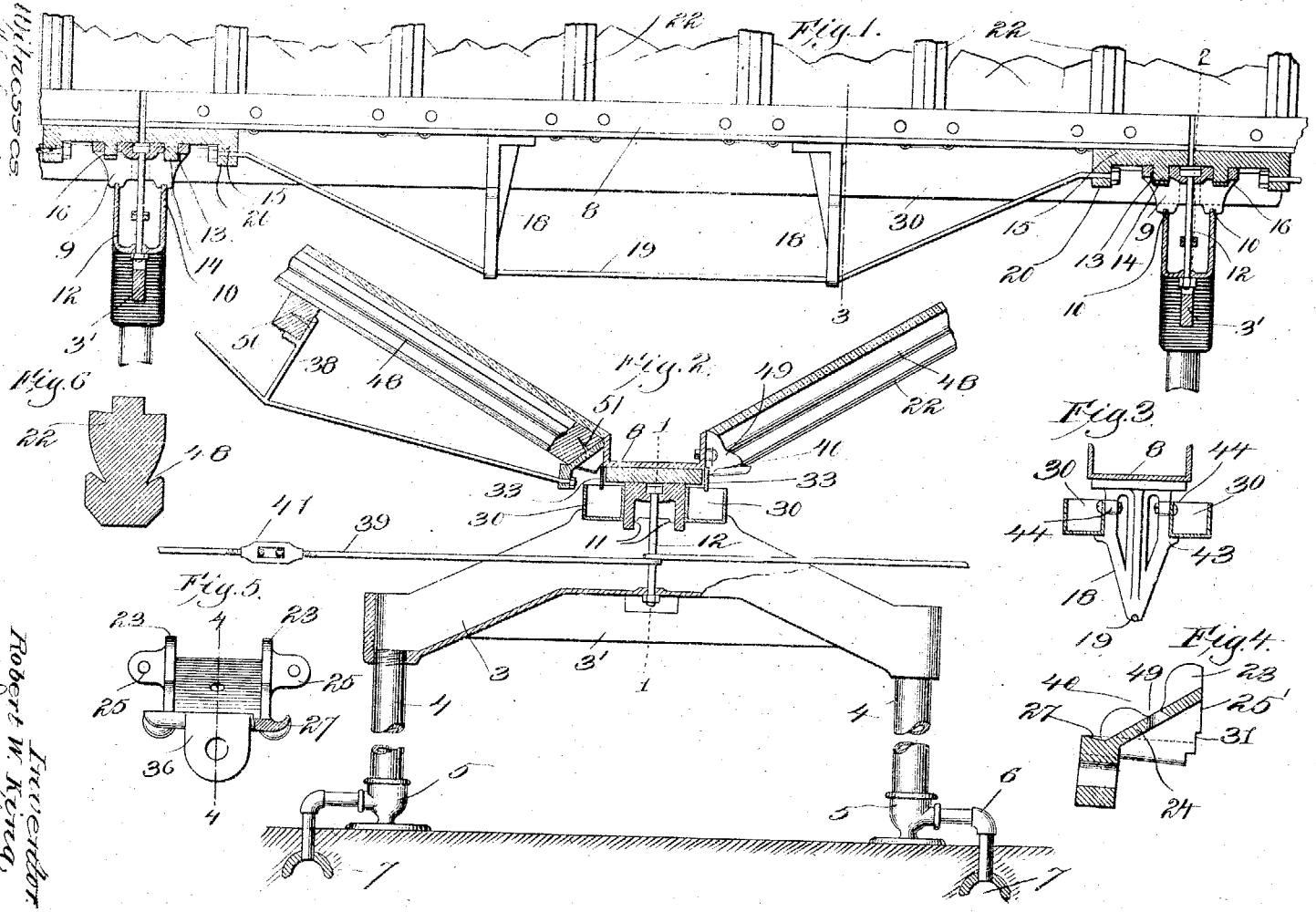
Witnesses.
H. C. Lunafrey
S. W. Lutton
Inventor.
Robert W. King,
by Crosby & Gregory,
attys.

UNITED STATES PATENT OFFICE.

ROBERT W. KING, OF TORONTO, CANADA.

BUILDING CONSTRUCTION.

No. 12,425. Specification of Reissued Letters Patent. Reissued Dec. 19, 1905.

Original No. 684,438, dated October 15, 1901. Application for reissue filed January 23, 1903. Serial No. 140,316.

*To all whom it may concern:*

Be it known that I, ROBERT W. KING, a subject of the King of Great Britain, residing at Toronto, in the Province of Ontario, Canada, have invented an Improvement in Building Construction, of which the following description, in connection with the accompanying drawings, is a specification, like numerals on the drawings representing like parts.

This invention relates to building construction which is especially adapted for greenhouses and similar structures in which there is a considerable area of glass in the roof; and one of its objects is to provide a novel way of collecting and disposing of the moisture or water of condensation which gathers on the inside of the roof of the building; and another object is to provide a greenhouse construction in which the roof presents a minimum amount of obstruction to the passage of sunlight.

One familiar way of taking care of inside moisture of condensation in greenhouses is to provide an inside gutter at the bottom of the slope of the roof and to connect said inside gutter with the usual outside gutter by one or more openings or drain-ducts which lead through the building or roof, so that any moisture of condensation that collects on the inside of the glass roof and runs down into said inside gutter can drain out through said ducts into the outside gutter. With this construction, however, any foreign matter which accumulates in the outside gutter is apt to clog the drain-ducts and render them useless, and, moreover, in cold weather said ducts are extremely apt to become frozen up.

With my invention these difficulties are avoided by conducting the moisture which collects in the inside gutter to a suitable drain through hollow roof-supports, the arrangement in the form of my invention herein shown being such that in passing from the inside gutter to the drain the water does not pass out of the building. In constructing a greenhouse to embody this form of my invention I provide suitable hollow supports for the roof and arrange suitable inside gutters or troughs at the foot of the slopes of the roof or beneath the valley of the roof and connect said gutters to the hollow roof-supports, so that any moisture of condensation which gathers on the inside of the roof and runs down the latter or any water which may leak through the roof will be collected in said gutter and conducted by the latter into the hollow roof-supports, said water passing through said supports into a suitable drain.

The hollow roof-supports herein illustrated comprise what I term "arch-heads," which are supported at each end by tubular standards or legs, said standards being connected to a drain. This construction is especially applicable for greenhouses in which it is desired to have walks beneath the valleys of the roof.

The beams or plates which are supported on the roof-supports have on either side thereof suitable laterally-projecting brackets in which the lower ends of the sash-bars of the roof are supported and which are arranged to take the end thrust of said sash-bars. Immediately underneath the beams, at either side thereof and supported on the arch-heads, are the inside gutters or troughs above mentioned, which empty into the hollow arch-heads. The brackets which support the ends of the sash-bars are each formed with a drip-groove surrounding them, the mouth of the drip-groove being immediately over the inside gutter or trough, so that any water which runs down the sash-bars will be collected in said grooves and deposited into the inside gutter or trough. By means of this construction the extent of the opaque portions of the roof are much reduced and a proportionately greater amount of sunshine may be admitted to the greenhouse. This will be more apparent when it is observed that by supporting the sash-bars on brackets on the outside of the beams or plates the width of the latter may be much reduced from what would be necessary if the said beams themselves had to be wide enough to furnish a support for the sash-bars and when it is also observed that the inside gutters are beneath the beams or plates instead of at the side of them.

In the drawings, Figure 1 is a section on the line 1 1, Fig. 2. Fig. 2 is a section on the line 2 2, Fig. 1. Fig. 3 is a section on the line 3, Fig. 1. Fig. 4 is a section of the sash-supporting bracket on the line 4, Fig. 5. Fig. 5 is an elevation of such bracket, and Fig. 6 is a section of the sash-bar.

Greenhouses are frequently made with a series of parallel roof-arches which generally run longitudinally of the building, each roof-arch comprising the usual sash-bars to which the glass is attached, the sash-bars serving as rafters and having their lower ends attached to and supported by plates or beams which are carried by suitable supports. When the roof comprises a series of parallel roof-arches, the meeting edges of adjacent arches are supported on a center plate or beam which extends along the valley of the roof and is common to both arches, and in Fig. 2 is illustrated the meeting portions of two such adjacent roof arches or spans. Since the number of arches in any one roof depends on the size of the greenhouse and since each arch is of the same structure, it is not deemed necessary to further illustrate the invention. Each roof-arch comprises the sash-bars 22, which besides their function as sash-bars to support the glass also have the function of rafters. These sash-bars or rafters are supported at their ends by beams or plates 8, which run lengthwise of the building and are shaped to constitute gutters for collecting and carrying off the rain-water falling on the outside of the roof. The center plates, or those which extend along the valleys of the roof and are common to adjacent roof-arches, are shown in the form of channel-iron. (See Figs. 2 and 3.) The means for supporting lower end of the sash-bars will be hereinafter described. The beams or plates 8 are supported on hollow roof-supports, those herein illustrated comprising what I term "arch-heads" 3 and standards or legs 4 for supporting each end thereof, the said arch-heads being in the nature of cross-girders which lie at right angles to the plates or beams 8 and are centrally positioned under said plates, as seen in Fig. 2. This form of the invention is particularly well adapted for greenhouses in which walks are to be placed beneath the valleys of the roof. Each arch-head is hollow, as hereinafter described, and the standards or legs 4 are also hollow, they preferably being tubular and being supported in arch-feet 5, which rest on suitable foundations, the said arch-feet being connected by a pipe 6 to a drain 7. The arch-supports thus described form the support for the roof-trusses, and, as seen in Figs. 1 and 2, the said arch-heads or cross-girders are made slightly arching and of channel-iron, so that they are substantially U shape in cross-section, and to strengthen the same I preferably provide the under side of each arch-head with the web 3′. As illustrated, each arch-head carries the chair 9, shown as inverted-U shape, the lower portions thereof having the notches 10, which set into suitable notches 11 in the top of the side portions of the U-shaped arch-heads, as plainly seen in Figs. 1 and 2. The top of the chair 9 is provided with a countersink, in which the head of a bolt 12 rests, the said bolt passing down through the bottom of the U-shaped arched head 3 and serving to secure the chair firmly in place. Each end of the chair is provided with a suitable aperture 13, through which lugs 14 upon the "beam ends" 15 project, the said beam ends having secured to them in any suitable way the beams or plates 8. To prevent the beam ends from becoming disengaged from the chairs, I may, if desired, pass suitable pins 16 through the lower ends of the lugs, as seen in Fig. 1.

With this construction it will be seen that the beams or plates 8 and their attached beam ends serve to tie together the various arch-heads, and in order to strengthen each beam I truss the same by attaching thereto the posts 18, having open sockets at their lower ends in which the truss-rod 19 is seated, the said truss-rod being fastened at its ends in any suitable way to lugs or ears 20 upon the beam ends. The beams 8, it will be understood, support the lower end of the sash-bars 22, the said sash-bars serving as a support for the usual glass roof.

I have devised a special way of supporting the sash-bars on the beams 8, which enables me to greatly reduce the width of beam necessary, thus reducing the obstruction to the passage of the sunlight through the roof. Each beam has rigidly secured to its sides brackets on which the lower ends of the sash-bars rest and which serve to take the longitudinal thrust of said rafters and transmit it to the plate or beam 8. In this embodiment of my invention the brackets are separate from the beams, (see Figs. 4 and 5,) and each has the side flanges 23, provided with a vertical edge 25′, and the base or seat 24, which is inclined, as illustrated in Fig. 4, and against which the end of the corresponding sash-bar or rafter seats or abuts, the upper edge of said base meeting the sides of the beam 8 at a point intermediate to the upper and lower edges thereof, as seen in Fig. 2. By reason of this construction the ends of the sash-bars rest partially against the base 24 and partially against the sides of the beam 8, it being understood that the ends of each sash-bar are beveled to fit the angle between the base 24 of the fitting or bracket and the side of the beam 8, the ends of the sash-bars being secured to the brackets by suitable screws 51. It will thus be seen that the brackets constitute the support for the rafters and take the longitudinal thrust thereof and transmit it to the plate 8. The brackets may be secured to the beams in any suitable way, as by means of the perforated ears or lugs 25. This construction enables me to materially reduce the width of the plate or beam 8, and thus reduce proportionately the obstruction which the roof presents to the sun's rays. Heretofore it has been customary to make the beams 8 of sufficient width to extend under the ends of the sash-bars; but by my improved construction the said beams need be only as wide as it is necessary to make the outside gutter. The lower portion of each of said brackets has the upwardly-inclined flange 27, projecting therefrom on three sides thereof, the said flange forming a drip-groove or the purpose of collecting any water of condensation which runs down the sash-bars. Each sash-bar is preferably provided with a drip-groove 48, running longitudinally along each side thereof, and each side flange 23 is cut away at 49 in line with the drip-groove 48, whereby any water which runs down said drip-grooves 48 can flow through the notches 49 in the side flanges and into the drip-grooves surrounding the brackets 40.

Any moisture of condensation which collects on the inside of the roof will either run down the glass or the drip-grooves 40 to the bottom of the slope of the roof, and to catch such drip gutters or troughs 30 are provided, which are situated beneath either side of the plate or beam 8 and are herein shown as seated in suitable recesses in the top of the side pieces of the arch-heads 3. These gutters, it will be noted, are situated entirely inside of the building and serve to collect only that water which runs down the inside of the roof, whether it be water of condensation or water which leaks through the roof. The said inside gutters are arranged so as to empty at their ends into the hollow arch-heads 3, as seen in dotted lines, Fig. 1.

With this construction it will be obvious that any water of condensation which collects on the glass or the sash-bars and runs down the same to the bottom of the slope of the roof will drip off into the troughs 30 and be conducted to the hollow arch-heads and through the standards 4 to the drains 7, the water which runs down the sash-bars being collected by the drip-groove 27 in the brackets 40 and being deposited into the troughs. It will be noted in this connection that the drip-groove which surrounds the bracket 40 is constructed on a slight inclination, as seen in Fig. 4, so that the water will freely pass out from the mouth thereof into the trough 30.

Referring to Fig. 3, it will be seen that the posts 18 are provided on opposite sides with lugs 43 and upon which the gutters or troughs 30 rest between their ends, the inside of said troughs being bolted to the posts by bolts 44. As seen in Fig. 4, the lower end of the vertical edge 25′ of the flanges 23 is provided with a notch 31, this notch being of the proper depth to receive the deflecting-plate 33, which is clamped between the fitting 40 and the beam 8, the lower edge of the plate extending below the under side of said beam, whereby said plate serves to direct the water which runs down the glass of the roof into the gutter 30 and prevent the same from flowing around underneath the beam 8.

In order to strengthen the roof-trusses, certain of the sash-bars may be trussed, as seen at the left in Fig. 2, in which case the corresponding bracket 40 will have the lug 36 depending from the outside thereof, the said lug serving to sustain the truss-rod 37, which passes over a king-post 38, secured to the purlin 50, and is secured at its other end to the roof-ridge in any suitable way. (Not shown.) The arch-heads at either side of any roof-arch may be tied together by suitable tie-rods 39, which are connected to the bolt 12 at their ends in any suitable way, the said tie-rods preferably having a suitable turnbuckle 41 therein for the purpose of keeping the structure taut. A roof made as above described is exceedingly strong and durable and at the same time can be easily set up or taken down should occasion require, and, furthermore, provision is made for the collecting and conducting to the outside of the building through the hollow supports for the roof of any water of condensation which accumulates on the inside of the roof.

In the form of invention herein shown the gutters 30 are situated entirely inside the building, and they are arranged to drain directly into the hollow roof-supports, so that the water which collects in said gutters is conducted to the drain without passing outside of the building. This construction has the advantage that the gutters 30 and hollow roof-supports cannot become clogged either by any foreign matter which collects on the outside of the roof or by becoming frozen, because the only time when any water of condensation will collect on the inside of the roof is when the temperature inside of the building is much above freezing, and as both the hollow roof-supports and inside gutters 30 are inside of the building there can be no danger of their becoming frozen. Moreover, by placing said gutters 30 directly beneath the beam or plate 8 they do not intercept any of the sun's rays.

It will be understood that various changes may be made in the structure of my device without departing from the spirit of my invention, and I therefore reserve the right to make such changes as come within the appended claims.

Having described my invention, what I claim as new, and desire to secure by Letters Patent, is—

1. In building construction, a roof, hollow supports therefor, and means located entirely inside of the building to conduct any moisture which gathers on the inside of the roof or may leak through the latter to said hollow supports.

2. In building construction, a roof, hollow supports therefor, a trough or gutter on the inside of the building and situated at the bottom of the slopes of the roof and constructed to drain directly into said support whereby moisture which collects on the inside of the roof may be conducted through said troughs to the hollow supports.

3. In building construction, a series of hollow arch-heads, roof-trusses supported thereon, and means for conducting the water of condensation which collects on the inside of the roof through the hollow arched heads and to a drain.

4. In building construction, a roof, a series of hollow arch-heads supporting the same, tubular standards for the arch-heads, said tubular standards being connected to a suitable drain, and a series of troughs situated at the bottom of the slopes of the roof, and emptying into said hollow arch-heads, whereby any moisture that collects on the inside of the roof is deposited into the troughs and conducted through the supports to the drain.

5. In building construction, a series of hollow supports, beams carried thereby, a roof supported on said beams, and means located inside of the building to conduct any moisture which gathers on the inside of the roof directly to said hollow supports.

6. In building construction for greenhouses, a series of hollow supports which are connected to a suitable drain, beams supported thereby, sash-bars connected at their lower ends to said beams, said sash-bars with the glass attached thereto forming a roof, and troughs underneath said beams and emptying into the hollow supports, whereby any moisture which collects on the inside of the roof is conducted through the troughs into the hollow supports.

7. In building construction, a series of arch-heads, U shape in cross-section, hollow standards supporting the same, beams carried by said arch-heads and supporting the roof, and troughs emptying into said arch-heads, said troughs being situated underneath said beams whereby the moisture which is collected on the inside of the roof will be caught by said troughs and conducted through the arch-heads.

8. In building construction for greenhouses, a series of hollow arch-supports, which are connected to a suitable drain, beams carried thereby, brackets secured to said beams and adapted to support the lower ends of the sash-bars, each bracket having a drip-groove extending around it, and a trough carried by and emptying into said arch-supports and situated beneath said beam, whereby any moisture which collects on the inside of the roof will be caught in said trough, the moisture which runs down the sash-bars being directed by the drip-grooves in the brackets into the trough.

9. In building construction for greenhouses, a series of hollow arch-supports, which are connected to a suitable drain, beams carried thereby and supporting the meeting edges of adjacent roof-arches, brackets attached to both sides of said beams, each bracket having a drip-groove extending around it, and notched side flanges, a sash-bar supported at its lower end in each bracket and between the side flanges of the latter, each sash-bar having a drip-groove which registers with the notch in the side flanges of the corresponding bracket, whereby the water which runs down the drip-grooves in the sash-bars is caught by the drip-grooves in the brackets, and means to conduct said water discharged by said drip-grooves in the brackets to the hollow arch-supports.

10. In building construction for greenhouses, a series of hollow supports which are connected to a suitable drain, beams carried by said supports, brackets attached to the said beams, each bracket having a drip-groove surrounding it, a sash-bar supported at its lower end in each bracket, deflecting-plates secured between the brackets and the beam, and troughs supported on and emptying into said supports whereby any water that runs down the inside of the roof will be deflected by said plates into the troughs and emptied into the hollow supports.

11. In building construction for greenhouses, a series of hollow supports, beams carried thereby, brackets connected to said beams, each bracket having a drip-groove extending around it, a sash-bar supported at its lower end in each bracket, and troughs situated underneath said brackets and emptying into the said hollow supports, certain of said brackets each having a lug depending therefrom, and each of the corresponding sash-bars being trussed and having the truss-rod secured to one of said lugs.

12. In building construction, a series of hollow arch-supports, chairs supported thereon and extending across the same, beam ends secured to said chairs, beams secured to said beam ends and tying together the adjacent arch-supports, and a roof supported on said beams.

13. In building construction for greenhouses, a roof and supports therefor, said roof comprising a series of sash-bars serving as rafters and glass suitably supported on said sash-bars, and a separate bracket for supporting the lower end of each sash-bar, said brackets each having a drip-groove partially surrounding the same, and means to catch the water delivered from the drip-grooves.

14. A supporting-bracket for sash-bars in greenhouse-roofs, said bracket having an inclined base or body portion of a size to fit and adapted to support the end of a sash-bar, and a drip-groove extending around three sides of said base or body portion, whereby any moisture which runs down the sash-bar is collected by the drip-groove.

15. A supporting-bracket for sash-bars in greenhouse-roofs, said bracket having an inclined base or body portion adapted to support the end of a sash-bar, parallel side flanges either side of said base or body portion, each side flange being notched, and a drip-groove partially surrounding the base.

16. A supporting-bracket for sash-bars in greenhouse-roofs, said bracket having an inclined base or body portion, parallel side flanges either side thereof, each side flange being notched, a drip-groove partially surrounding the base or body portion, ears extending from said side flanges for attaching the bracket to a beam or other support, and a perforated lug at the base of the body portion adapted to receive a truss-rod.

17. In a greenhouse construction, a beam or plate shaped to present an outside gutter, said beam being no wider than the gutter, brackets on the outside of the beam projecting laterally therefrom, and sash-bars supported entirely by said brackets.

18. In greenhouse construction, a beam or plate constituting an outside gutter, said beam being no wider than the gutter, brackets projecting outwardly from each side of said beam, and sash-bars supported entirely by the brackets.

19. In a greenhouse construction, a beam or plate having brackets projecting from its sides, sash-bars supported in said brackets, and means to support said beam, said brackets each having a drip-groove partially surrounding the same, combined with means situated beneath the beam for catching the water delivered from the drip-groove.

In testimony whereof I have signed my name to this specification in the presence of the subscribing witnesses.

ROBT. W. KING.

Witnesses:
WILLIAM EDGAR RANEY,
ALEXANDER MILLS,
JAMES HALLS.